Aug. 1, 1961 F. H. DALRYMPLE ET AL 2,994,422
CONVEYOR CHAIN
Filed May 10, 1957 5 Sheets-Sheet 1

INVENTORS
FERDINAND H. DALRYMPLE &
FRANK P. SMILEY
BY
George W. Saywell
ATTORNEY

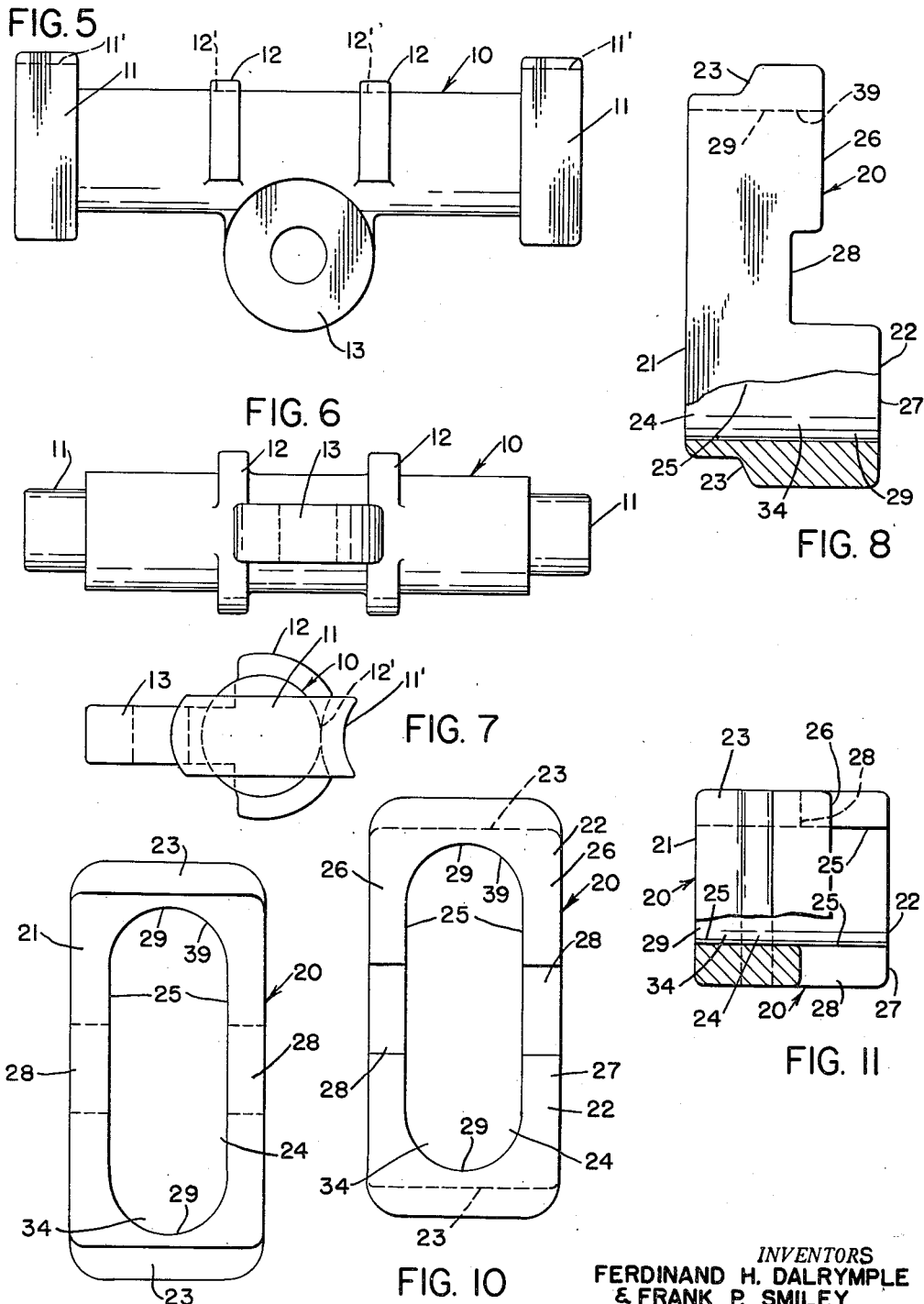

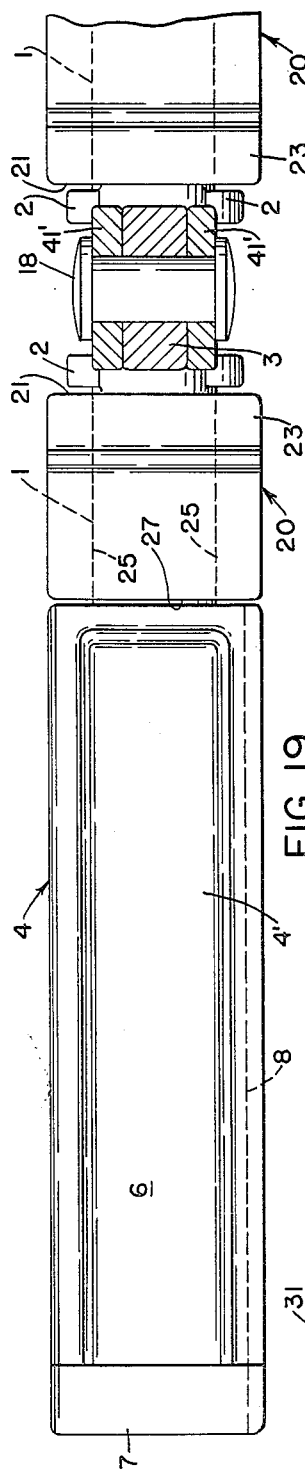

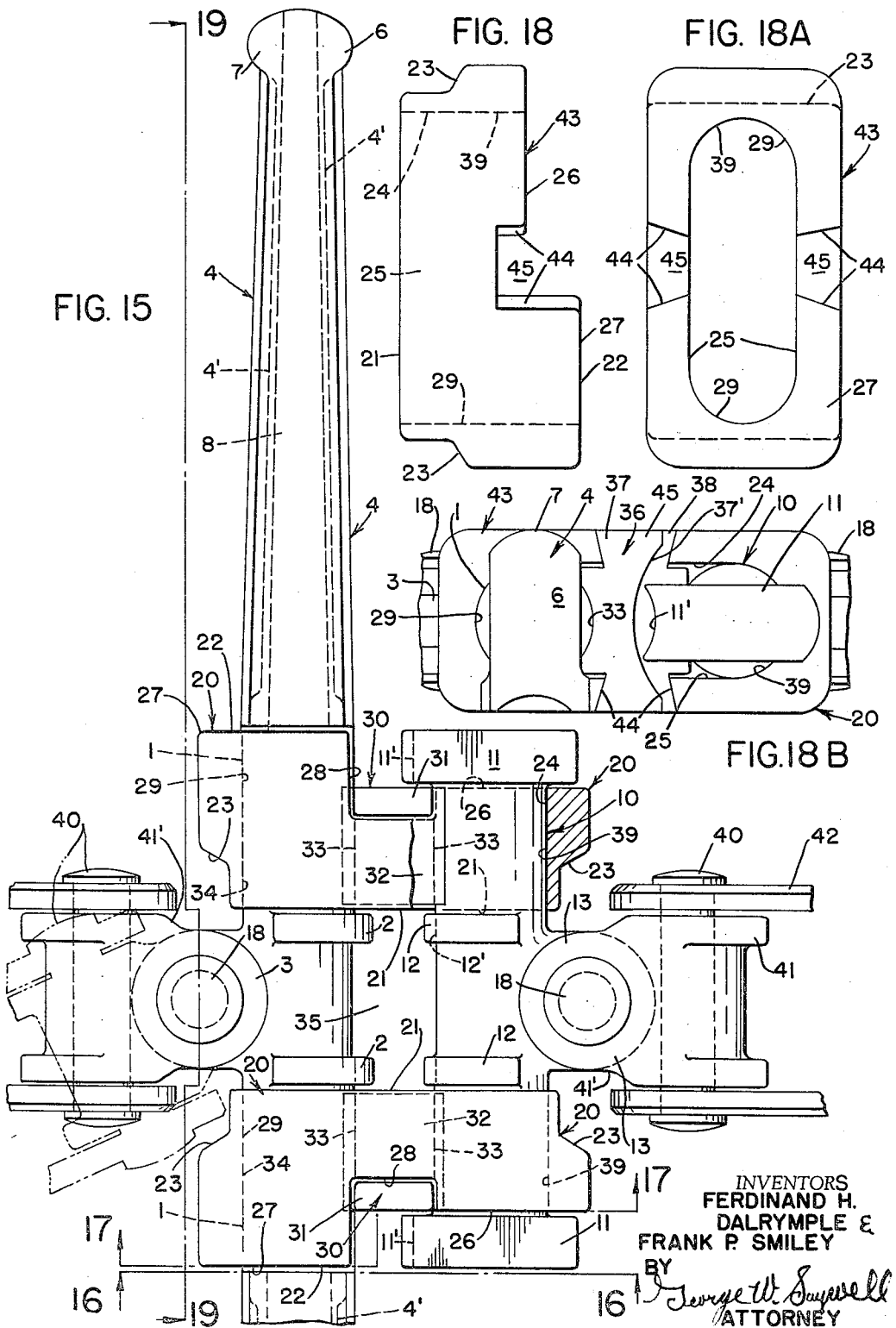

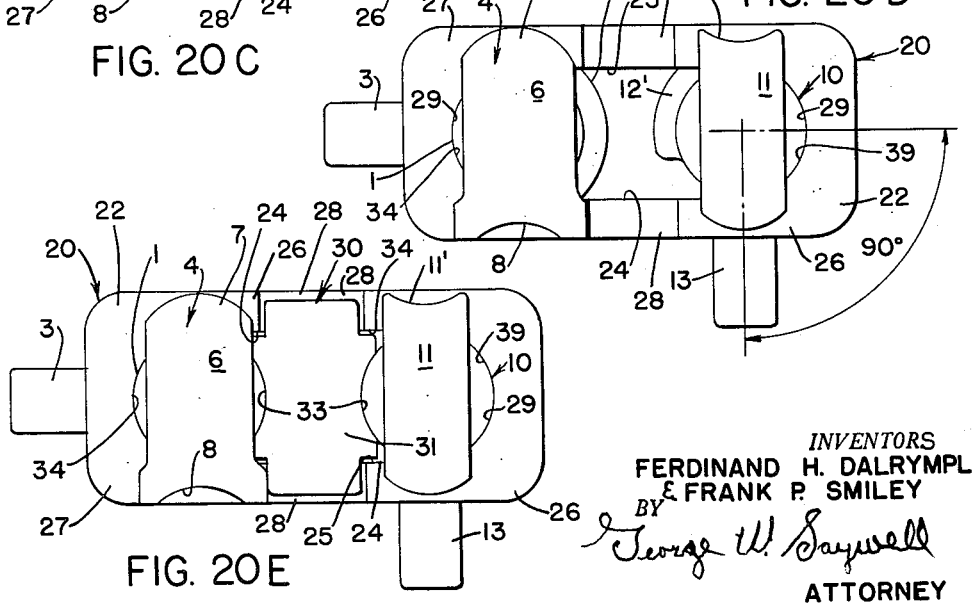

United States Patent Office 2,994,422
Patented Aug. 1, 1961

2,994,422
CONVEYOR CHAIN
Ferdinand H. Dalrymple, Bedford, Ohio (1211 Marshall Bldg., Cleveland 13, Ohio), and Frank P. Smiley, Lakewood, Ohio (1726 Allen Drive, Westlake, Ohio)
Filed May 10, 1957, Ser. No. 658,457
2 Claims. (Cl. 198—176)

The invention relates to conveyor chain and particularly to equipment of this character of the flight type. An important feature of the invention is an integral chain element comprising a conveyor flight, a pin, and a swivel member. This chain element is combined with another improved integral chain element having a pin and a swivel member so as to form of such two elements, when connected together in spaced relation, a chain unit having a central driving-sprocket engagement area.

The two aforementioned improved integral chain elements are combined with releasably lockable connecting links and spacer blocks to form an improved chain pin link assembly the swivel members of which cooperate with the ends of standard chain links to provide a partially lateral swivel action between the improved chain unit and the standard links. In such swivel action the swivel members of the two improved chain elements, being integral with the chain pin and the flight in one instance, and with the lock pin in the other instance, do not turn, but the standard chain links turn. The pins which are integral with the two chain elements each turns in the said releasably lockable connecting links.

The two integral chain elements of the improved chain pin link assembly are each provided with two spaced projections or ribs surrounding the pins in part and forming between them, when the two improved chain elements are properly spaced, the central sprocket engagement area. Both improved chain elements are symmetrically arranged on the two sides of the center line of chain travel, with a transversely-extended flight upon each side of the assembly. The swivel members extend outwardly and centrally and longitudinally from the chain pins and in these extended areas the ribs are interrupted to provide space for the lateral swiveling movements of the ends of standard chain elements.

Laterally exteriorly of the element ribs the two elements are releasably held together in spaced relation by the aforesaid connecting links, and the pin of one of the elements is laterally projected therefrom to form integral conveyor flights. The second pin element has enlarged end heads having different dimensions in relatively angular directions which, by reason of the rotatability of the element on the pin axis, act as means for the insertion, removal, and retaining of the spacer blocks between the confronting surfaces of the two pins. The first-mentioned chain element, which is the one in which the conveyor flights form integral parts, is also rotatable on its pin axis for assembly purposes and for sprocket operation.

As stated, the swivel members are integral with the respective chain pins and articulate with flexing members forming the adjacent ends of standard chain elements. Therefore, the swivel members of the improved chain do not turn on their chain pins; whereas, insofar as we are informed, in chain now known the swivel members of the flight units, or what are commonly utilized as the members thereof providing a swivelling movement, do turn on their chain pins.

The invention is further distinguished by having curved surface portions and plane sliding surfaces on relatively movable abutting parts, of which the abutting curved surfaces are closely correspondent in curvature. Thus, the invention provides for assembly purposes an interfitting sliding relationship where necessary between pins and spacer blocks, and pins and pin ribs, and pins and connecting links. Also, there are abutting sliding surfaces for the necessary relative turning of swivel members and the adjacent ends of the standard chain elements whereby lateral swivelling movements of the standard links relative to the improved chain unit are effected. Preferably, the swivel members of the respective improved chain elements are the male members for the partial universal movement, and the female members are formed as parts of the adjacent portions of the standard links. However, recesses may be formed in the improved integral chain elements, and sliding cooperating ribs on the standard links, and it is so illustrated in FIGURE 14.

No welding is involved in the manufacture or assembly of the improved chain pin unit assembly and no tools are required for assembly.

The improved chain assembly is also characterized by its bearing and strength. The pins of the improved assembly have an area about three times the value of the areas in pins in current use, and the bearing advantages are about four to one.

Possible lateral swivelling exceeds fifty degrees as against an inherent forty-five degrees maximum in present universals. This fifty degree swivelling can be increased, if necessary, by minor chain design changes.

The flight elements of the instant improved assembly are on one pin only (one-half a chain pitch) as against a complete pitch for flights of present chain.

The above improved characteristics apply particularly to the chain design shown in the accompanying drawings (a one and three-quarters inch pitch chain) but the same would be substantially true of all chain, with the pin area and bearing advantages in approximately the same ratios for other chain pitches.

The annexed drawings and the following description set forth in detail certain means illustrating the improvements in conveyor chain, such disclosed means constituting, however, only a few of the many forms in which the principle of the invention may be embodied.

In said annexed drawings:

FIGURE 5 is a top plan of the other element of the improved chain unit;

FIGURE 6 is a rear elevation of the element shown in FIGURE 5;

FIGURE 7 is an end view of the element shown in FIGURES 5 and 6;

FIGURE 8 is a partial plan view and a partial horizontal section of a releasably lockable connecting link for the flight pin element shown in FIGURE 2 and the lock-pin element shown in FIGURE 5;

FIGURE 9 is an inside face view of the connecting link shown in FIGURE 8;

FIGURE 10 is an outside face view of said connecting link;

FIGURE 11 is a partial end elevation and a partial vertical section of the connecting link as shown in FIGURE 8;

FIGURE 12 is an outside elevation of a removable spacing block for the two chain elements;

FIGURE 12A is a rear elevation of the block shown in FIGURE 12;

FIGURE 13 is an outside elevation of a modified form of spacing block;

FIGURE 13A is a rear elevation of the block shown in FIGURE 13;

FIGURE 14 is a section of a part of a modified form of swivel member in which said swivel member serves as the female member for articulation with the ends of sections of standard chain;

FIGURE 15 is a plan view, in operating position, of one of the improved chain unit assemblies shown in FIGURE 1, the flight at one side of the improved assembly being broken away, the view also showing the improved swivel assembly between the chain unit assembly and the adjacent ends of standard chain;

FIGURE 16 is a longitudinal side view, taken in the plane indicated by the line 16—16, FIGURE 15;

FIGURE 17 is a vertical section, taken in the planes indicated by the line 17—17, FIGURE 15;

FIGURE 18 is a plan view of a modified form of connecting link adapted for association with the spacing block shown in FIGURES 13 and 13A;

FIGURE 18A is an outside face view of the connecting link shown in FIGURE 18;

FIGURE 18B is a longitudinal side view, similar to FIGURE 16, in which the modified spacing block of FIGURES 13 and 13A and the modified connecting link of FIGURES 18 and 18A are shown;

FIGURE 19 is a front elevation, partially in section, taken in the planes indicated by the line 19—19, FIGURE 15;

FIGURE 20 is an end elevation showing the two improved chain elements in abutting position, and illustrating the first step of the assembly of the various parts of the improved chain unit, the particular position shown being one in which the pin element having the flights has been turned 90° from its normal operating position;

FIGURE 20A shows a second assembly step in which the releasable connecting links have been slipped on both sides of the abutting chain elements;

FIGURE 20B is a showing of a third assembly step in which the flight pin has been turned 90° back to operating position;

FIGURE 20C is a showing of a fourth assembly step in which the flight and chain pins have been spread apart to the ends of elongated longitudinal openings formed in the releasable connecting links;

FIGURE 20D is a fifth assembly step showing the condition when the lock-pin has been turned 90° from the position shown in FIGURE 20C; and FIGURE 20E is a sixth assembly step in which the spacing blocks have been inserted between the elements shown in FIGURE 20D. The showing in this FIGURE 20E is one preliminary to the final operating position shown in FIGURE 16, and the showing of FIGURE 16 is obtained therefrom by a turning of the lock-pin from the position shown in FIGURE 20E to the position shown in FIGURE 16.

For illustrative purposes, the improved conveyor chain is shown and described in this specification and drawings as traveling from right to left. It will be understood, however, that the chain can travel in both directions.

The improved conveyor chain unit comprised of the integral flight element, the cooperating integral lock pin element, and the means for releasably connecting together said two elements is characterized by the following distinctive features, inter alia, that assembly and disassembly can be completed while all other universal members and standard chain parts remain in assembly; that all of the component members, other than the flight-pin members, can be reversed in their relative positions to the flight-pin member; and that a flight section of the chain unit which is of generally rectangular formation and whose dimension in one direction is greater than the diametrical dimension can be directly placed into normal operating position by insertion through the releasable connecitng link members.

Figure 1:
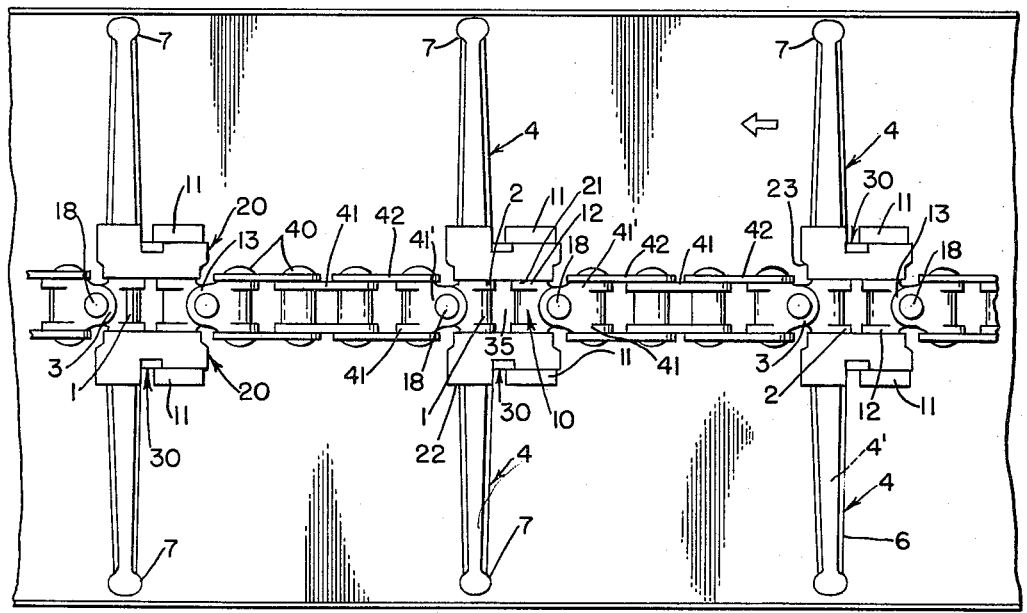
FIGURE 1 is a plan view of three chain unit assemblies each of which exemplifies our invention in chain elements, these assemblies being combined with alternate sections of standard chain secured at its two ends to and for lateral swivel action with the aforesaid chain unit assemblies.
Figure 2:
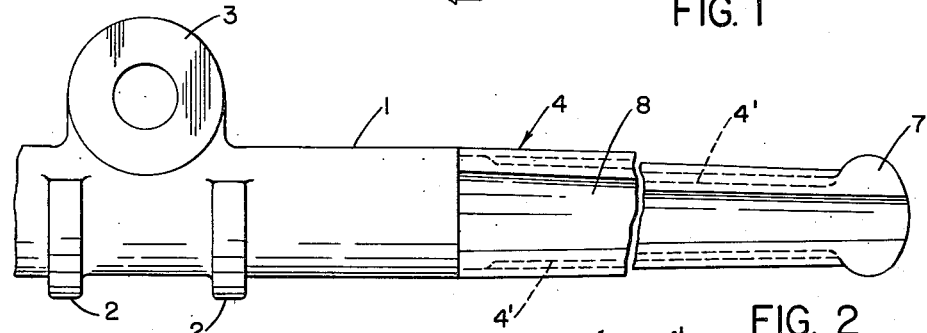
FIGURE 2 is a broken and fragmentary bottom plan view (full size) of one of the improved chain elements, this element being the flight element.
Figure 3:
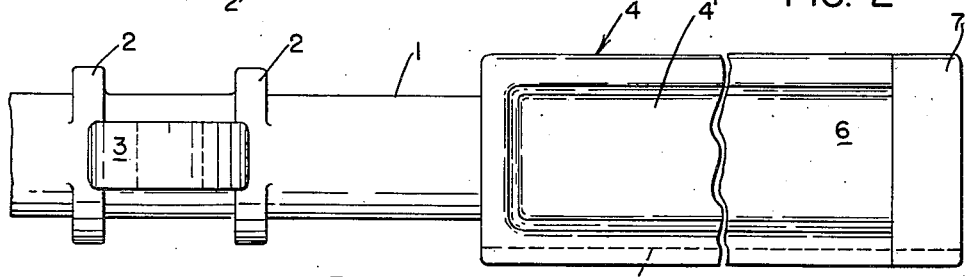
FIGURE 3 is a front elevation of the element shown in FIGURE 2.
Figure 4:
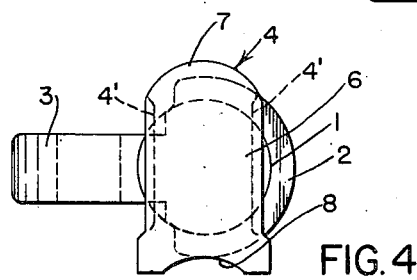
FIGURE 4 is an end elevation of the element shown in FIGURES 2 and 3.

Referring to the annexed drawings in which the same parts are designated by the same respective numbers in the several views, and particularly first referring to FIGURES 2, 3, and 4, one one-piece integral transverse chain element comprises a chain pin 1 having spaced ribs 2 extending up to the transverse plane of the inner edge of a central outwardly-extended integral swivel element 3, and end conveyor flights 4, the latter extending at right angles to the direction of normal chain travel. The flight 4 is elliptical top and bottom in cross-section at its outer end, as at 7, and concave throughout on its bottom side, as at 8. The body 6 of the end of the flight 4 is of rectangular formation, as clearly appears in FIGURE 4, tapers outwardly on its sides from the pin 1 to the outer end of the flight, and is recessed on both sides as indicated by 4'.

The chain pin 1 extends from the inner end of the flight 4 on one side of the element to the inner end of the flight 4 on the opposite element side and is formed with the spaced outwardly-projected ribs 2 symmetrically arranged relatively to the ends of the pin 1, the swivel element 3 being a tubular member outwardly-projected from and symmetrically arranged relatively to the longitudinally planes defining the ends of the ribs 2.

Incorporated with the aforesaid integral element is another integral element spaced from the first element to provide a sprocket engagement area 35, FIGURE 15, and comprising a lock pin 10 having end heads 11, FIGURES 5, 6, and 7, symmetrically arranged spaced ribs 12 extending up to the transverse plane of the inner edge of a swivel element 13 outwardly extended and symmetrically arranged relatively to the longitudinal planes defining the ends of the ribs 12. The design and dimensions of the heads 11 can be such as are found most suitable for the particular chain. Centrally of the ribs 12 is a concave surface portion 12' of a depth and configuration to permit the rib 2 of the pin 1 to nest and turn therein. The front end of the head 11 is concave, as indicated at 11', and can accommodate the pin 1 with a sliding fit.

The two integral chain elements are releasably secured together in spaced relation by a pair of connecting links 20, FIGURES 8, 11, and 15, within which the two integral chain elements are rotatable on their axes, these links 20 having elongated openings 24 formed with curved end portions 29 which provide the ends of the walls 25 of the openings 24 and upon which the pins 1 and 10 rotate. The connecting links 20 are also formed with notched corners 23 on their inner sides, the inner link face 21 between said corners 23 confronting one of the ribs 2 of the chain pin 1 and one of the ribs 12 of the chain pin 10. The connecting link 20 has also an outside face 22 one portion 26 of which confronts a pin head 11 and another spaced portion 27 of which confronts the inner end of a flight 4. The outside surface of the connecting link 20 is such that the exterior face portion 27 extends further outwardly than the exterior face portion 26 and between these face portions 26 and 27 there is a break in the surface, as indicated by 28, for reception of a spacer block 30 hereinafter more fully mentioned.

The pins 1 and 10 of the integral chain elements are spaced apart by spacer blocks 30, FIGURES 12, 12A, 15, and 16, interposed transversely between the pins 1 and 10 adjacently within the overlapping inner face of the end heads 11 of the chain pin 10, FIGURE 15. When thus assembled the outer faces of the pin heads 11 lie substantially in the longitudinal plane of the exterior face portions 27 of the links 20, FIGURE 15. This spacer block 30 is comprised of a head 31, FIGURES 12 and 12A, and a stem 32 having concave outside faces 33 upon which the surfaces of pins 1 and 10 can slide. The concave outer side faces 33 extend throughout the length of the block 30, FIGURE 12A. The locking block 30 is positioned in the space provided by the break 28 of the connecting link 20, the exterior face of the head 31 abutting the inner side of the elongated dimension of the pin head 11 when the chain is in operating assembly. In this operating assemblage of the improved chain unit the ends of the pin 1 are disposed in the portion 34 of the opening 24 of the connecting link 20 and the ends of the pin 10 are disposed in the portion 39 of the opening 24 of the connecting link 20, FIGURE 10.

The aforesaid assembly comprised of the two integral chain elements, shown in FIGURE 15, is secured to the adjacent ends of chain sections comprised of a multiple of standard links 41 and cooperating connecting links 42 secured together for vertical flexing by pins 40. The connecting links 41 are formed with connecting arms 41' by which and pins 18 they are connected to swivel brackets 3 and 13 for transverse flexing.

In FIGURES 13 and 13A is shown a modified form of spacing block, and in FIGURES 18 and 18A is shown a modified form of connecting link adapted to cooperate with the modified form of spacing block. In FIGURE 18B is shown a view similar to FIGURE 16 in which the modified forms of spacing block and connecting link are utilized. These modified structures are for the purposes of providing means for an additional positive lock when the flight-pin 1 turns to an angular position, such as occurs when the chain unit arcs a sprocket; also serve as tie members between the sides of the chain link at midpoint; provide additional length support of the flight-pin 1; and closes the openings at the outer ends of the flight-pin 1 and the connecting link 20 to prevent foreign materials of substantial size from possible wedging or packing.

The modified structure of the spacer block 36, FIGURES 13 and 13A, includes a deeper head 37 on the block 36 having on one side a concave surface portion 37' of longer dimension than the exterior concave surface portions 33 of the spacer block 30, FIGURES 12 and 12A, and providing a concave surface portion 38' on an additional strip 38 formed upon the block 36 interiorly of the head 37. The concave surface portion 38' is identical with the concave surface portion 33, FIGURES 12 and 12A. The upper and lower ends of the head 37 slope inwardly and are accommodated by sloping walls 44 of the breaks 45 in the correspondingly modified form of connecting link 43 shown in FIGURES 18 and 18A. As above stated, the assembly of these modified structures of spacer block and connecting link is shown in FIGURE 18B.

The improved chain unit is assembled as follows:

With their centers in line, the flight pin 1 and the lock pin 10 are arranged parallel to each other and as close together as possible, with the swivel elements 3 and 13 positioned relatively 90° apart, as shown in FIGURE 20. In this position the pin 1 engages the concave surface 11' and the rib 2 engages the concave surface 12'.

Then a connecting link 20 is slipped over the flight 4 of the pin 1 and the head 11 of the pin 10 on each side, as shown in FIGURE 20A.

Then turn the flight pin 90°, as shown in FIGURE 20B.

Then move both pins 1 and 10 to their respective bearing positions 29 in the curved end portions of the elongated openings 24, thus providing a mid-pitch opening between the pins 1 and 10, as shown in FIGURE 20C.

Then turn the lock pin 90°, as shown in FIGURE 20D.

Then insert the spacer blocks 30 in the break 28 adjacently interior of the heads 11 of the pin 10, as shown in FIGURE 20E.

A turning back of the lock-pin 10 will lock the assembly in operating position shown in FIGURE 15.

Assembling procedures, other than the one described, may be practiced when found advisable, particularly procedures wherein each connecting link 20 is separately assembled.

What we claim is:

1. A conveyor chain unit, for use intermediate two standard chain sections each having links pivotally connected for relative movement thereof in one plane, said unit having an integral element comprising a conveyor flight and a pin member, the latter having a surface formed for sprocket engagement, said unit further comprising a second pin member formed with a sprocket engagement surface cooperative with the sprocket engagement surface of the integral element to constitute a sprocket engagement area between the pin members, means, including an apertured link, for releasably holding together the integral element and the second pin member in respective operative chain positions, said link accommodating the positioning therein concurrently of both the pin member of the integral element and the second pin member in an inoperative position of the chain unit, the integral element and said second pin member having engaging surfaces which permit the relative turning thereof upon their respective axes when both are positioned in the link, a block receivable by the link when the integral element and the second pin member are relatively turned in the link into inoperative chain position, the block spacing the integral element and the second pin member apart when it is positioned in the link in operative chain position, the integral element and the second pin member each being provided with an integral swivel member adapted to cooperate with the respective adjacent ends of two standard chain sections for relative movement of the standard chain sections in a plane transverse to the aforementioned plane to form a two-way flex chain.

2. A conveyor chain unit, for use intermediate two standard chain sections each having links pivotally connected together for relative movement thereof in one plane, said unit having a transverse integral element comprising a conveyor flight at each end and a central pin member, the latter having a surface formed for sprocket engagement, said unit further comprising a second transverse pin member relatively longitudinally and symmetrically disposed to the pin member of the integral element, said second pin member being formed with a sprocket engagement surface cooperative with the sprocket engagement surface of the central pin member of the integral element to constitute a sprocket engagement area between the pin members, means, including an apertured link on each side of the chain unit, for releasably holding together the integral element and the second pin member in respective operative chain positions, the apertures of the links accommodating the positioning therein concurrently of both the pin member of the integral element and the second pin member, in an inoperative position of the chain unit, the integral element and said second pin member having engageable surfaces which permit the relative turning thereof upon their respective axes when both are positioned in a link, blocks receivable by the links when the integral element and the second pin member are relatively turned in the links into inoperative chain position, the blocks spacing the integral element and the second pin member apart when they are positioned in the links in operative chain position, the second pin member having integral end heads of different lineal dimensions in relatively angular planes which, in an inoperative position of the chain unit, permit the insertion of the blocks into the links between the integral element and the second pin member, the assembly being locked into an operative chain unit position by a relative turning of the integral element and the second pin member into parallel alignment, the integral element and the second pin member being provided with integral swivel members longitudinally extended respectively forwardly and rearwardly of the pin member of the integral element and the second pin member and adapted to cooperate with the respective adjacent ends of the two standard chain sections in a plane transverse to the aforesaid plane to form a two-way flex chain.

References Cited in the file of this patent

UNITED STATES PATENTS

| | | |
|---|---|---|
| 1,377,371 | Tench | May 10, 1921 |
| 1,453,088 | Bachman et al. | Apr. 24, 1923 |
| 1,817,647 | Redler | Aug. 4, 1931 |
| 1,904,167 | Redler | Apr. 18, 1933 |
| 1,999,484 | De Los Sindin | Apr. 30, 1935 |
| 2,450,501 | Clarkson | Oct. 5, 1948 |
| 2,674,365 | Russell | Apr. 6, 1954 |